United States Patent [19]
Naumann

[11] Patent Number: 5,936,737
[45] Date of Patent: Aug. 10, 1999

[54] WHEELSET SENSING SYSTEM

[75] Inventor: Hans J. Naumann, Albany, N.Y.

[73] Assignee: Simmons Machine Tool Corporation, Albany, N.Y.

[21] Appl. No.: 09/076,283

[22] Filed: May 12, 1998

Related U.S. Application Data

[63] Continuation-in-part of application No. 08/597,833, Feb. 7, 1996, Pat. No. 5,767,973.

[51] Int. Cl.$^6$ ................................................ G01B 11/24
[52] U.S. Cl. ............................................ 356/376; 356/385
[58] Field of Search ................................ 356/121, 376, 356/384–387; 250/559.22, 559.24

[56] References Cited

U.S. PATENT DOCUMENTS

3,767,146  10/1973  Gallagher .
4,798,963   1/1989  Wittkopp et al. .
4,932,784   6/1990  Danneskiold-Samsoe .
5,636,026   6/1997  Mian et al. .

*Primary Examiner*—K P Hantis
*Attorney, Agent, or Firm*—Howard J. Greenwald

[57] ABSTRACT

A process for measuring the wheel profiles of wheels of wheelsets in which the wheelsets are moved past a series of a least twenty-six separate sensors while being rotated and moved at specified speeds. The wheelsets are impinged with a multiplicity of laser beams whose reflections are measured by the sensors, thereby indicating various wheel profile properties. In one embodiment, the wheelsets are rotated at a speed of less than 75 revolutions per minute while being moved at a speed of less than 6 miles per hour. In another embodiment, the wheelsets are rotated at a speed of greater than 400 revolutions per minute while being moved at a speed of greater than 45 miles per hour. In both embodiments, the wheelsets are moved past the sensors in a period of less than about 20 seconds.

8 Claims, 9 Drawing Sheets

WHEELSET SENSING SYSTEM

CROSS-REFERENCE TO RELATED PATENT APPLICATION

This application is a continuation-in-part of applicant's patent application U.S. Ser. No. 08/597,833, filed on Feb. 7, 1996, now U.S. Pat. No. 5,767,973.

BACKGROUND OF THE INVENTION

The rail network in North America is the largest in the world, operating with the high axle loads customarily used with heavy freight hauling railways. Unfortunately, the rail network in North America is also characterized by an inordinately high number of railroad accidents and derailments; these incidents occur at a substantially higher rate in North America than anywhere else in the world.

One of the causes of this safety problem is a lack of ability in the North American Railway system to readily and efficiently evaluate the condition of the wheel profiles of the wheelsets used in the locomotives, freight trains, and passenger trains.

In a publication entitled "Economics of Wheelset Management," which was presented in June of 1994 at the International Heavy Haul Association 1994 Mini-Conference held in Omaha, Nebr., applicant disclosed that excessive wear of railroad wheelsets causes many problems, including reduction of wheelset service life, an increase in the traction power required to move the trains, the production of extremely high dynamic forces during operation, damage to the wheelsets, rails, bearings, and vehicle structures during operation, derailments, and accidents.

Those skilled in the art are aware of the need to readily, efficiently, and automatically measure the properties of wheelsets under conditions of normal operation. However, to the best of applicant's knowledge, no such process currently exists.

It is an object of this invention to provide a process for readily, efficiently, and automatically measuring the properties of wheelsets during normal operation.

SUMMARY OF THE INVENTION

In accordance with this invention, there is provided a process for measuring the wheel profiles of wheels of a wheelset. In the first step of the process, the wheelset is rotated at a speed of at least about 400 revolutions per minute while moving it at a speed of at least about 45 miles per hour in order to measure the presence of a high flange or a hollow tread on the wheel profiles of the wheelset. Thereafter, a first wheel of the wheelset is impinged with a multiplicity of laser beams to determine the wheel profile of the first wheel, a second wheel of the wheelset is impinged with a multiplicity of laser beams to determine the wheel profile of the second wheel, and the wheelset is rotated at a speed of less than about 75 revolutions per minute while moving it a a speed of less than about 6 miles per hour and impinging the wheelset with a multiplicity of laser beams to measure the high flange, flange height, flange thickness, rim thickness, wheel diameter, and tread contour on the wheel profiles of the wheelset.

BRIEF DESCRIPTION OF THE DRAWINGS

Applicant's invention will be described by reference to the following drawings, in which like elements are described by like numerals, and in which.

DESCRIPTION OF THE PREFERRED EMBODIMENTS

In the process of this invention, the dimensions and geometry of a wheel profile is preferably determined with the use of a laser beam.

Figure 1:
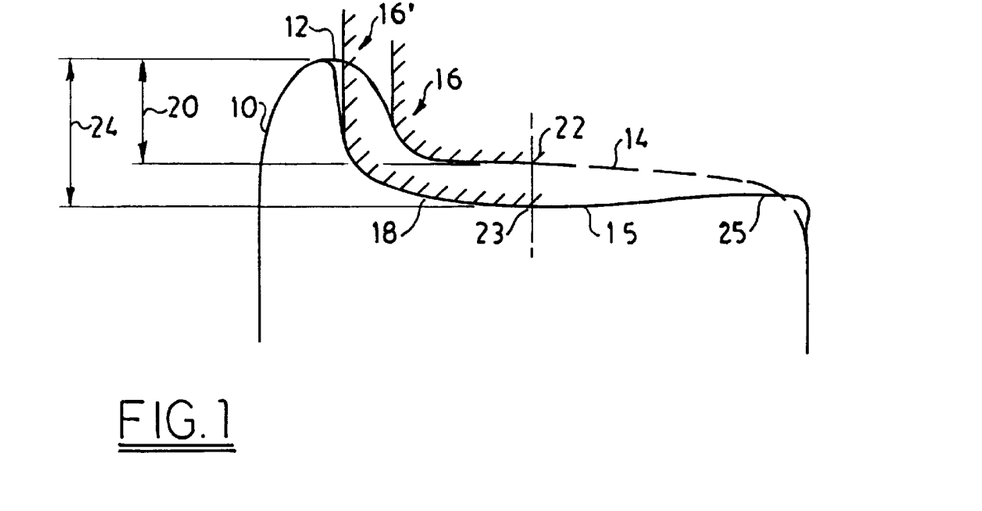
FIG. 1 is a sectional view of a worn wheel profile (full line) and an unworn wheel profile (dotted line)

FIG. 1 is a sectional view of a wheel profile 10. Referring to FIG. 1, it will be ssen that full wheel profile 10 is comprised of the full profile 12 of the wheel flange, the full profile 14 of the wheel tread, and the rail head 16 projected against wheel profile 10.

FIG. 1 also illustrates the worn wheel flange and tread profile 18 with the railhead 16' projected against the worn wheel profile.

As will be apparent, the wear that occurs on the wheel profile 10 creates a substantially different flange and tread contour leading to a substantially narrower and higher flange.

The profile of a new wheel has a 1/20 taper. As is known to those skilled in the art, this taper is required to provide sale and efficient rail/wheel interaction.

Referring again to FIG. 1, it will be seen that the wearing of the wheel profile 12 and 14 substantially reduces the required taper and causes the production of an undesired hollow flange 15. The presence of hollow flange 15 causes an uncontrolled lateral acceleration of the wheelset in the rail.

In the undesired hollow tread the slope of the worn tread contour changes from a negative taper to a positive taper at about taper line 23 and increases to a larger wheel diameter towards the wheel edge 25. By comparison, the slope of the unworn tread does not change from a negative taper to a positive taper, or from a positive taper to a negative taper.

Referring again to FIG. 1, in the worn wheel profile 18, the height 24 between tape line 23 and flange 12 is substantially greater than originally designed (see original height 20). This undesirable property is known as "high flange."

In the process of this invention, the wheel profile of a wheel rotating at different speeds is measured by means of a laser beam.

Means for measuring various properties of a moving object with one or more laser beams are well known to those skilled in the art. Thus, e.g., reference may be had to U.S. Pat. Nos. 5,443,537 (adjusting wheel and axle alignment using laser beam equipment), 5,440,923 (measuring the inclination of a vehicle by laser ranging units), 5,371,581 (use of a horizontally rotating beam from a laser rangefinder to detect and measure the distance to ground objects which may present a hazard to a helicopter), 5,314,037 (an automobile collision avoidance system based on laser radars), 5,274,433 (laser-based wheel alignment system), 5,240,359 (machining apparatus in which variations in the levels of rails are determined by a sensor which monitors a reference defined by a planar laser beam), 5,048,954 (laser-based wheel alignment system), 4,413,684 (laser-controlled ground leveling device), and the like. The disclosure of each of these United States patents is hereby incorporated by reference into this specification.

Laser beams have also been used to measure the properties of railroad wheelsets. Thus, the Loram Maintenance of Way, Inc. company (of 3900 Arrowhead Drive, Hamel, Minn.) has developed "Loram's Automatic Wheel Inspection System" ("AWIS"). This system uses an optical imaging system to collect wheel specifications instantly. Different points of data are transmitted to a central computer, where they can be compared, sorted, and retrieved according to individual needs. Actual data points displayed include train direction, train number, speed, date, wheel dimensions (such as flange height, flange thickness, rim thickness, angle of attack, and wheel diameter), and the like.

Figure 2:
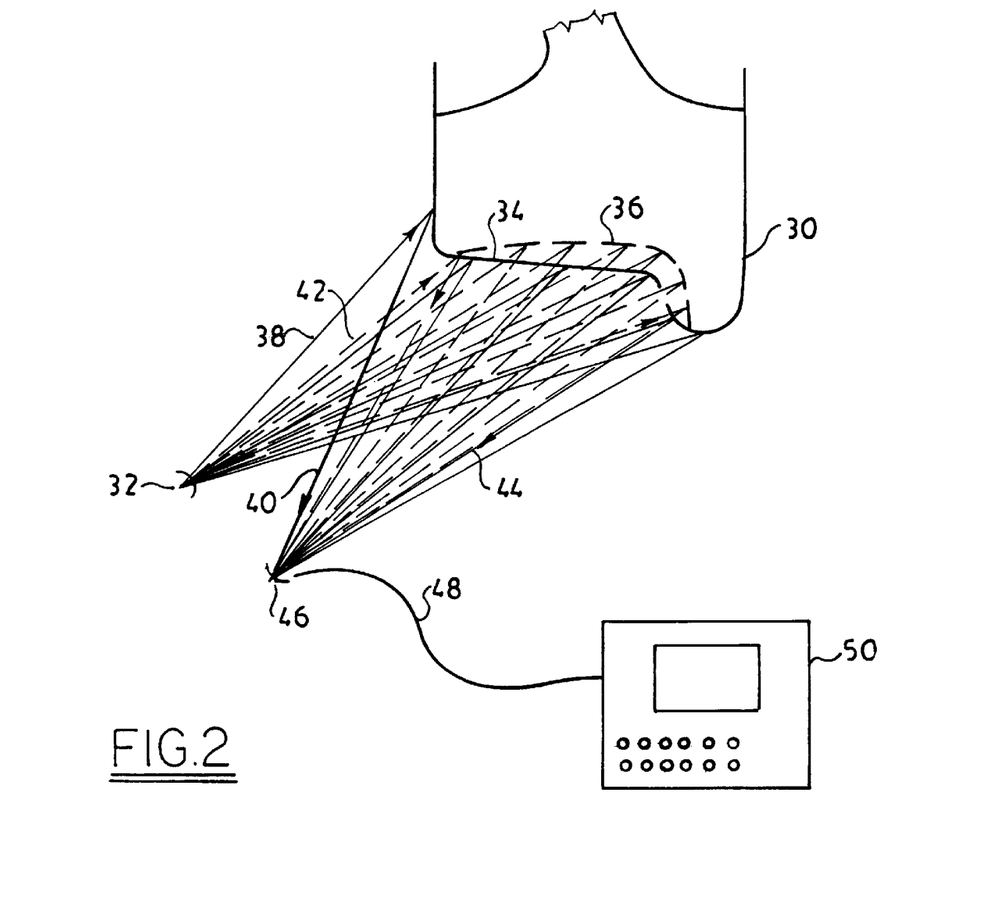
FIG. 2 is a schematic view of one preferred process for sensing a part of a wheel profile.

FIG. 2 is a schematic view of a wheel profile 30 which, during operation under normal conditions, is contacted with a multiplicity of rays from laser 32. Two depictions of wheel profile 30 are presented. The original wheel profile 34 is shown in solid line, and the wheel profile 36 which occurs after substantial wear is shown in dotted line. The laser beams 38 which impact original wheel profile 34 are reflected as reflected beams 40. By comparison, the laser beams 42 which impact worn wheel profile 36 are reflected as reflected beams 44. The laser beams reflected from either original wheel profile 34 or worn wheel profile 36 are received by sensor 46. In one embodiment, sensor 46 is an optical system comprised of cameras. In other embodiments, other conventional means for sensing reflected laser rays are used.

Referring again to FIG. 2, and in the preferred embodiment depicted therein, information sensed by sensor 46 is transmitted via data link 48 to computer 50.

The system depicted in FIG. 2 may be used to measure the extent to which, if any, a wheel rotating at a speed of at least about 400 revolutions per minute has a high flange and/or a hollow tread. The system depicted in FIG. 3 may be used to measure the extent to which, if any, a wheel rotating at a speed of less than about 75 revolutions per minute has a high flange, flange height, flange thickness, rim thickness, wheel diameter, and tread contour.

Figure 3:
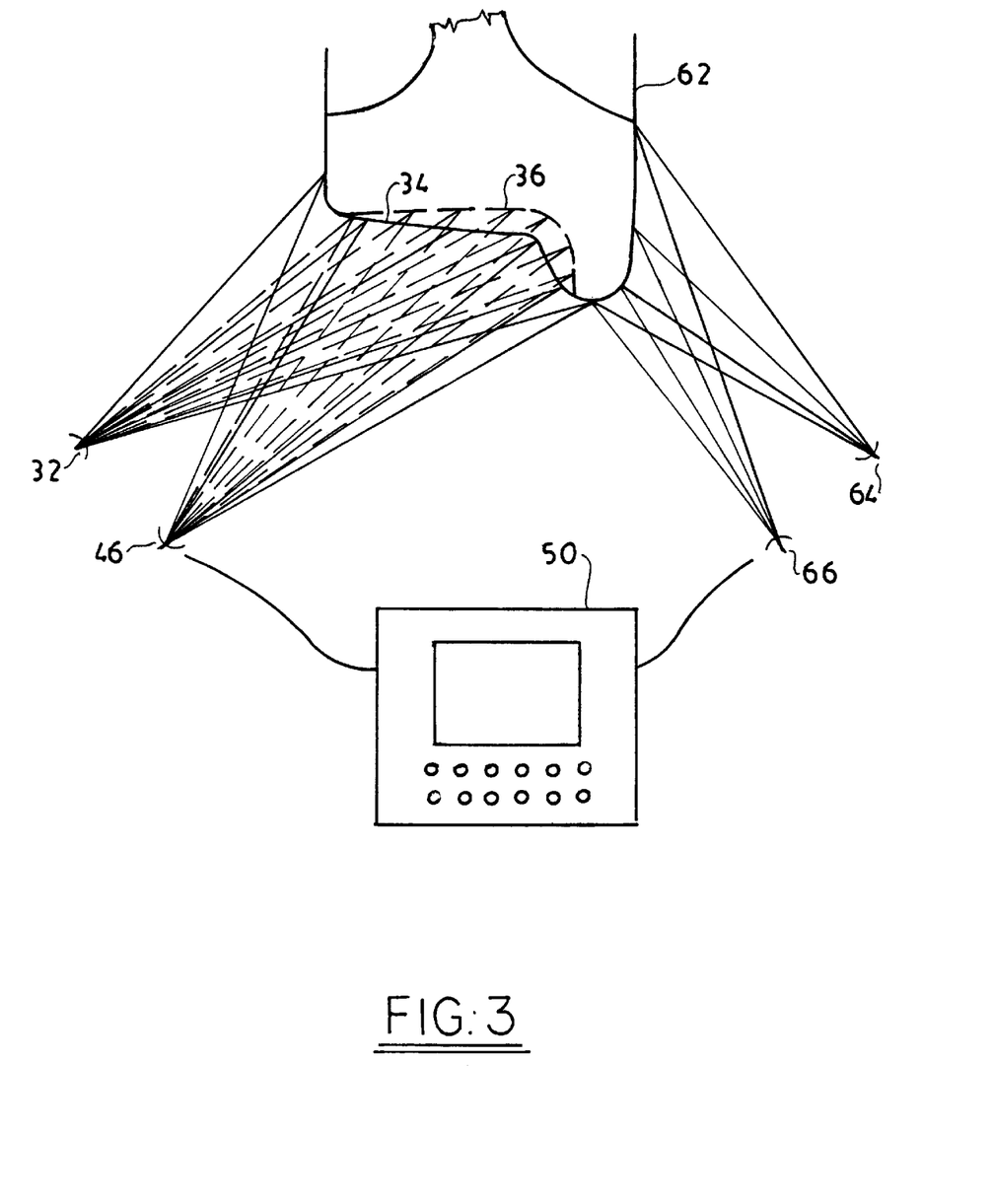
FIG. 3 is a schematic view of another preferred process for sensing another part of a wheel profile.

In the embodiment depicted in FIG. 3, unnecessary detail has been omitted for the sake of simplicity of representation. In this embodiment, a separate set of measurements on the backside 62 of the wheel is made by means of laser 64 and sensor 66. In one embodiment, these measurements are made at the same time the measurements are made with laser 32 and sensor 46. In another embodiment, these measurements are made at a different time and under different conditions. Thus, e.g., they may be made while the wheel is stationary, or when the wheel is moving at a low speed such as, e.g., a speed less than about 75 revolutions per minute.

Figure 4:
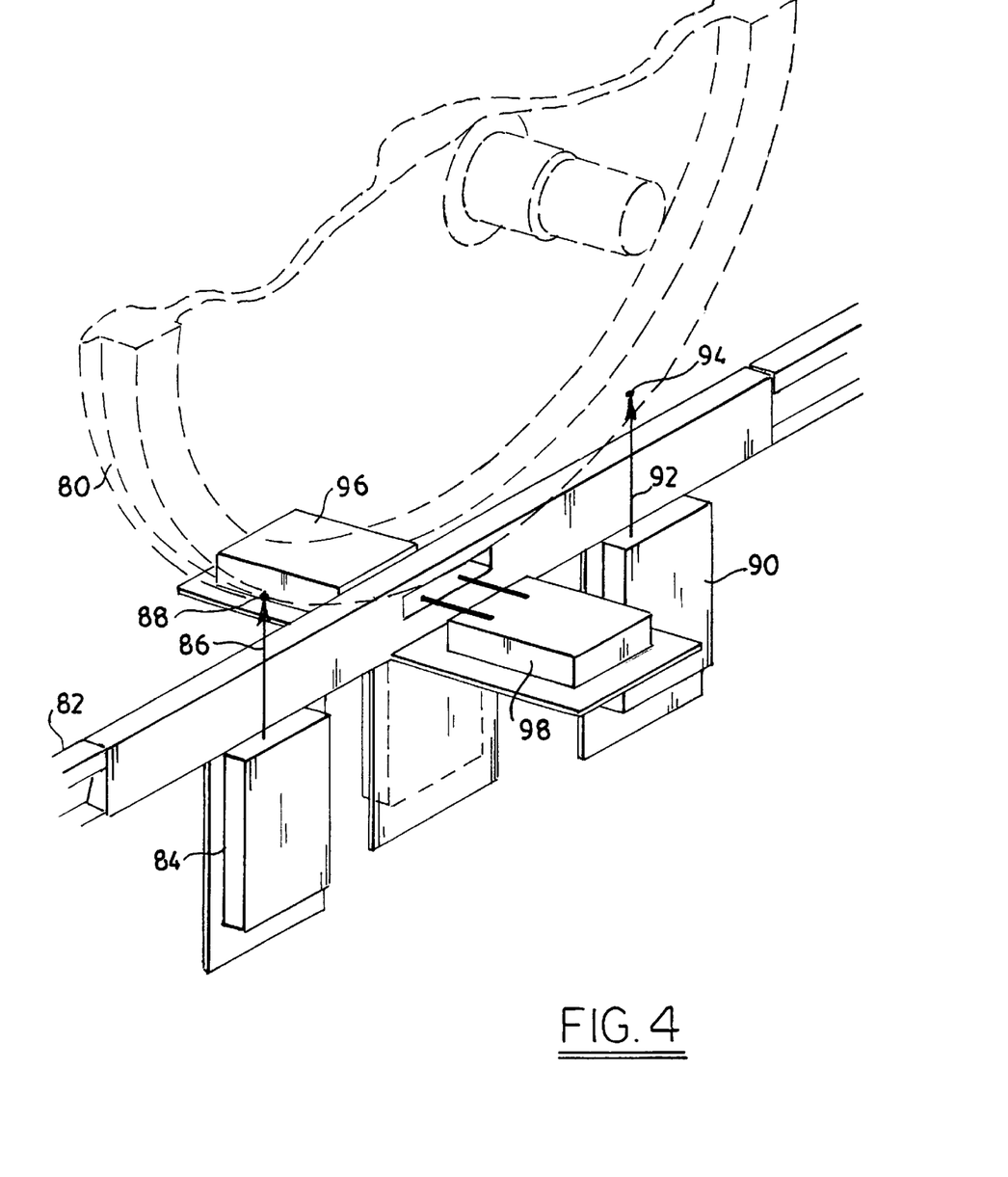
FIG. 4 is a schematic view of yet another preferred process for sensing portions of a wheel profile.

FIG. 4 is a partial perspective view of a wheel 80 of a wheelset riding on a rail 82. In the apparatus depicted in FIG. 4, laser 84 emits a beam 86 which contacts wheel 80 at point 88. Similarly, laser 90 emits a beam 92 which contacts wheel 80 at point 94. Beams 86 and 92 are reflected back to units 84 and 90, which also contain means for sensing and evaluating the reflected beams. This information is then used to calculate the diameter of wheel 80 at its tape line.

Laser units 96 and 98 are disposed on either side of wheel 80 and, with the use of laser beams appropriately directed towards the wheel flange, can be used to determine the flange thickness and the flange height.

Figure 5:
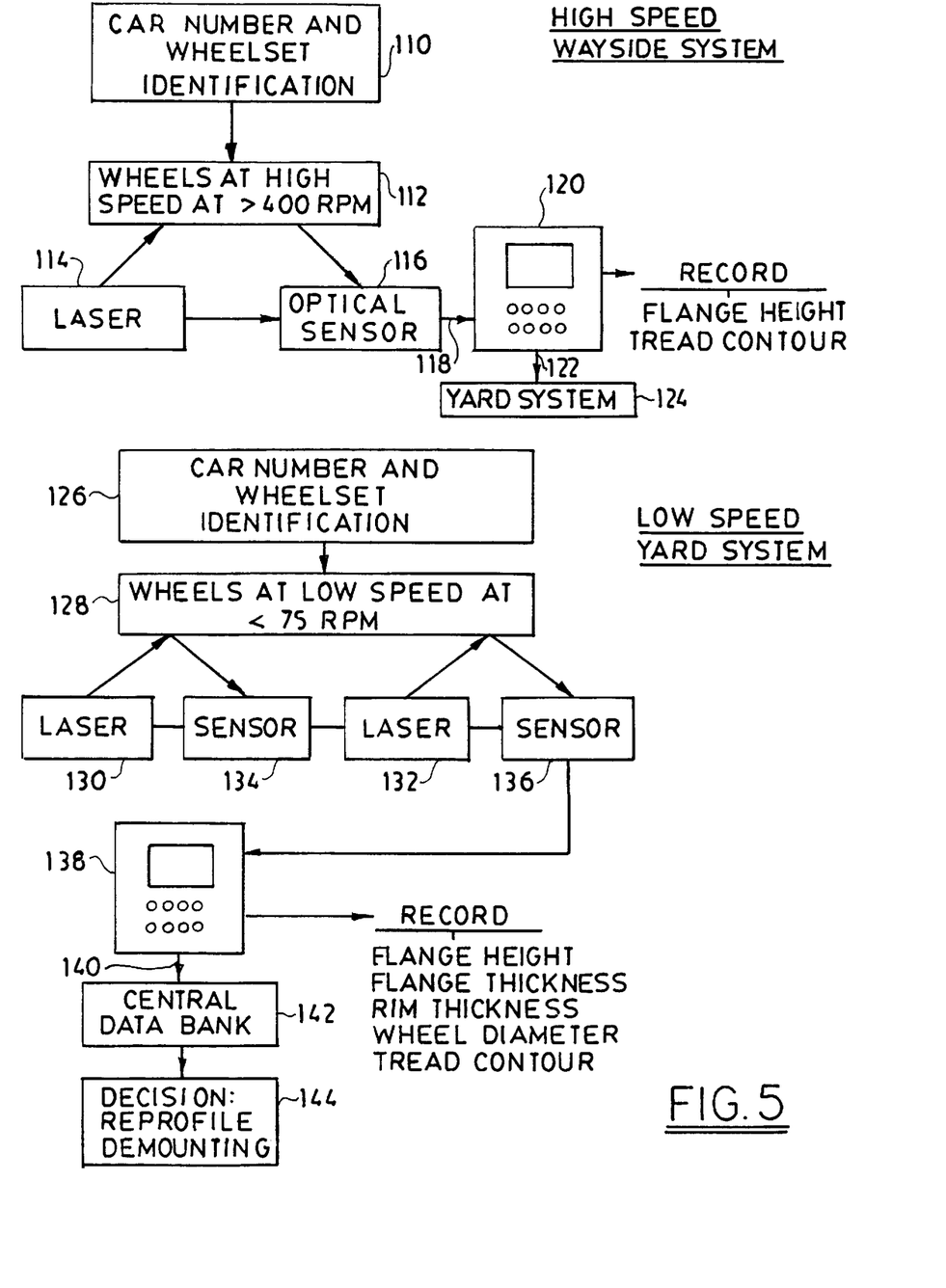
FIG. 5 is a flow diagram of one preferred process of the invention.

FIG. 5 is a flow diagram illustrating one preferred process of the invention. In step 110, the identity of a railcar and the number of the wheelset being measured is determined by conventional means.

In step 112, the flange height and the tread contour of the wheel rotating at speed greater than 400 revolutions per minute is determined by the use of laser 114 and optical sensor 116.

The information from optical sensor 116 is fed via line 118 to computer 120, which produces a record of measurements made. In computer 120 determines that the taper of the wheel measured is less than zero, then it will issue an alert.

The taper of the wheel profile is the slope of the wheel profile; and, in an unworn wheel profile, it always exceeds zero.

In a worn wheel profile, by comparison, one or more hollows exist, and a portion of the profile may have a taper above zero while another portion may have a taper below zero (see FIG. 1).

Referring again to FIG. 5, if computer 120 detects a taper below zero in the tread contour, it will report the presence of such a hollow in the wheel contour to the next railroad yard in the line equipped with a low speed measuring system. Such an alert may be sent via line 122 to yard system 124. Alternatively, or additionally, the alert may be sent to a central data bank.

As the car which has been flagged passes into the yard, its car number and the relevant wheelset are again identified by conventional means in step 126. Thereafter, in step 128, the wheels at low speed (less than 75 revolutions per minute) are then evaluated by lasers 130 and 132, and optical sensors 134 and 136. In this low speed measurement system, one can measure the flange width, the flange thickness, the rim thickness, the wheel diameter, and the tread contour. Because the wheels are rotating at low speed, the measurements made are more accurate than those made at high speed. The information generated is fed to computer 138, which makes a record of the data produced. If it is determined that the wheel(s) involved are unsatisfactory, a signal is then sent via data link 140 to central data bank 142. Based on the data furnished, a decision 144 now can be made as to whether to remove the wheels and the wheelset from service for reprofiling or demounting.

Figure 6:
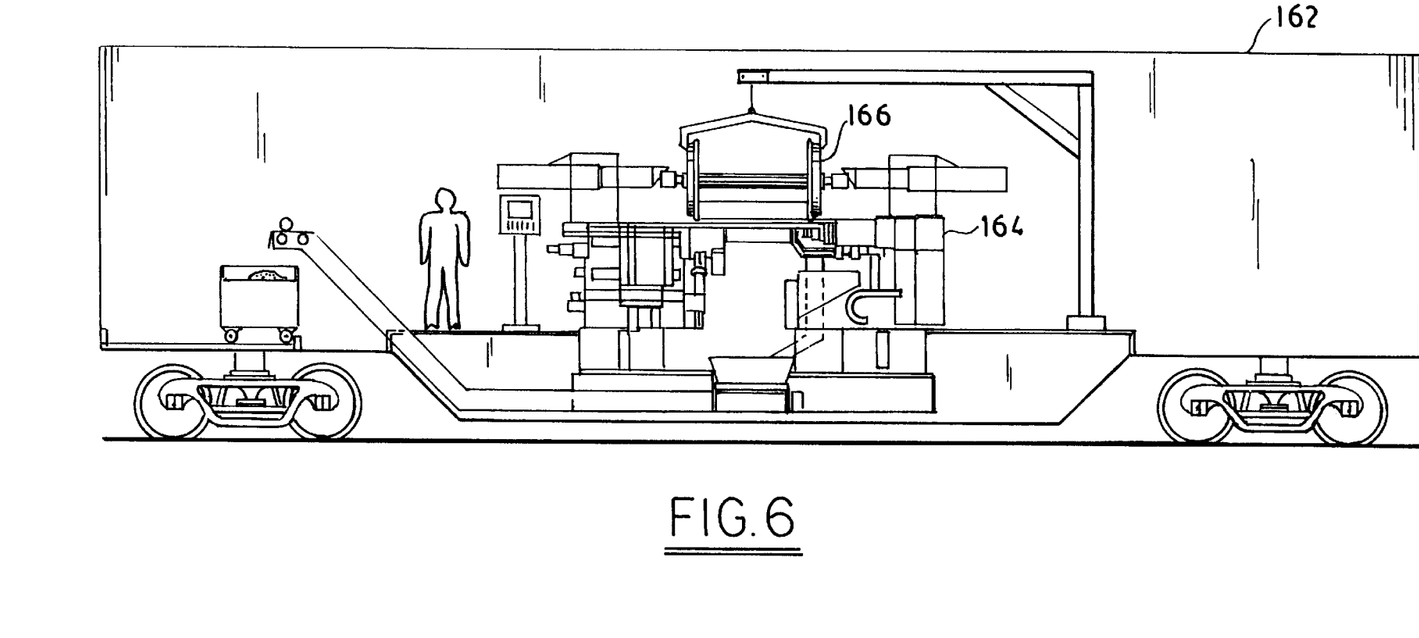
FIG. 6 is a schematic view of a portable wheelset truing machine.
Figure 7:
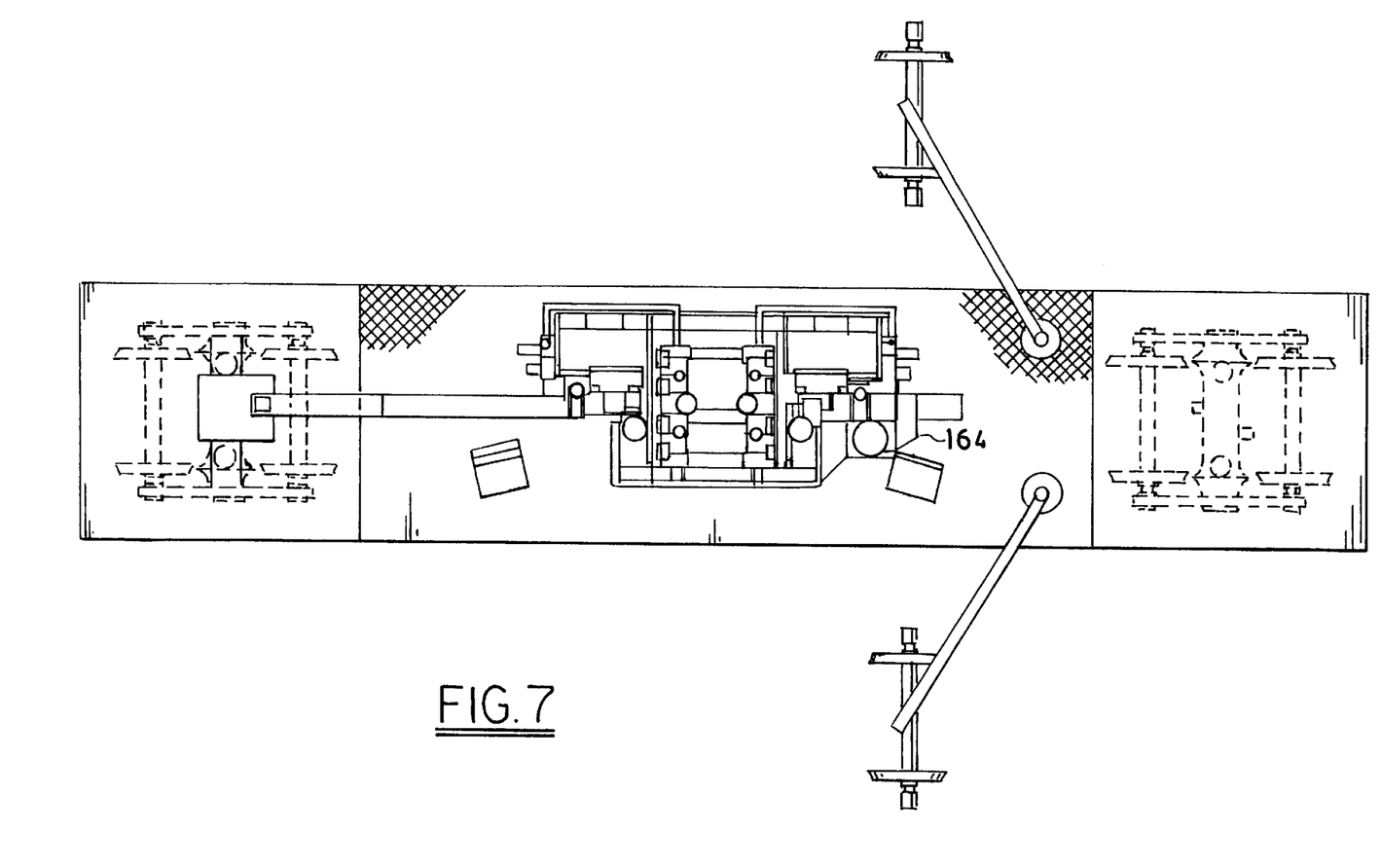
FIG. 7 is a top view of the truing machine of FIG. 6.

FIG. 6 is a schematic view of a portable wheel reprofiling system 160 comprised of a rail car 162 and a wheelset reprofiling system 164. FIG. 7 is a top view of the profiling system of FIG. 6.

One may use any of the wheel reprofiling systems known to those skilled in the art such as, e.g., those systems described in U.S. Pat. Nos. 1,071,615, 1,250,869, 1,432,579, 2,431,654, 2,622,378, 2,630,725, 2,645,003, 2,677,307, 2,678,487, 2,727,343, 2,823,493, 3,044,368, 3,540,103, 3,540,164, and the like. The disclosure of each of these United States patents is hereby incorporated by reference into this specification.

Referring again to FIGS. 6 and 7, wheelset 166 is preferably loaded into car 162 through either the top of such car or its side.

In the embodiment depicted in FIGS. 6 and 7, the reprofiling is preferably conducted by milling technology which produces small chips which can readily be disposed of. This is important for the environment of the profiling machine installation.

ANOTHER PREFERRED PROCESS OF THE INVENTION

In yet another preferred process of this invention, a process is provided for use with the high speed trains which Amtrak will be using in the Northeast Corridor of the United States.

In an article appearing on pages 722–728 of the November, 1996 issue of "Railway Gazette International," it is disclosed that, in 1999, Amtrak will be running high speed train service with "American flyer trainsets" traveling at speeds of 225 kilometers (141 miles) per hour. It is well known that train instability increases geometrically with speed; thus, the proposed high speed operation makes it more essential than ever to be able to insure that the wheelsets on the high speed trains are within specifications. Derailments of crowded trains in a crowded Northeast Corridor could have disastrous consequences.

In one preferred process, multiple measurements are made of the wheel profiles of a wheelset in a relatively short period of time. One preferrred embodiment of this process is illustrated in FIG. 8.

Figure 8:
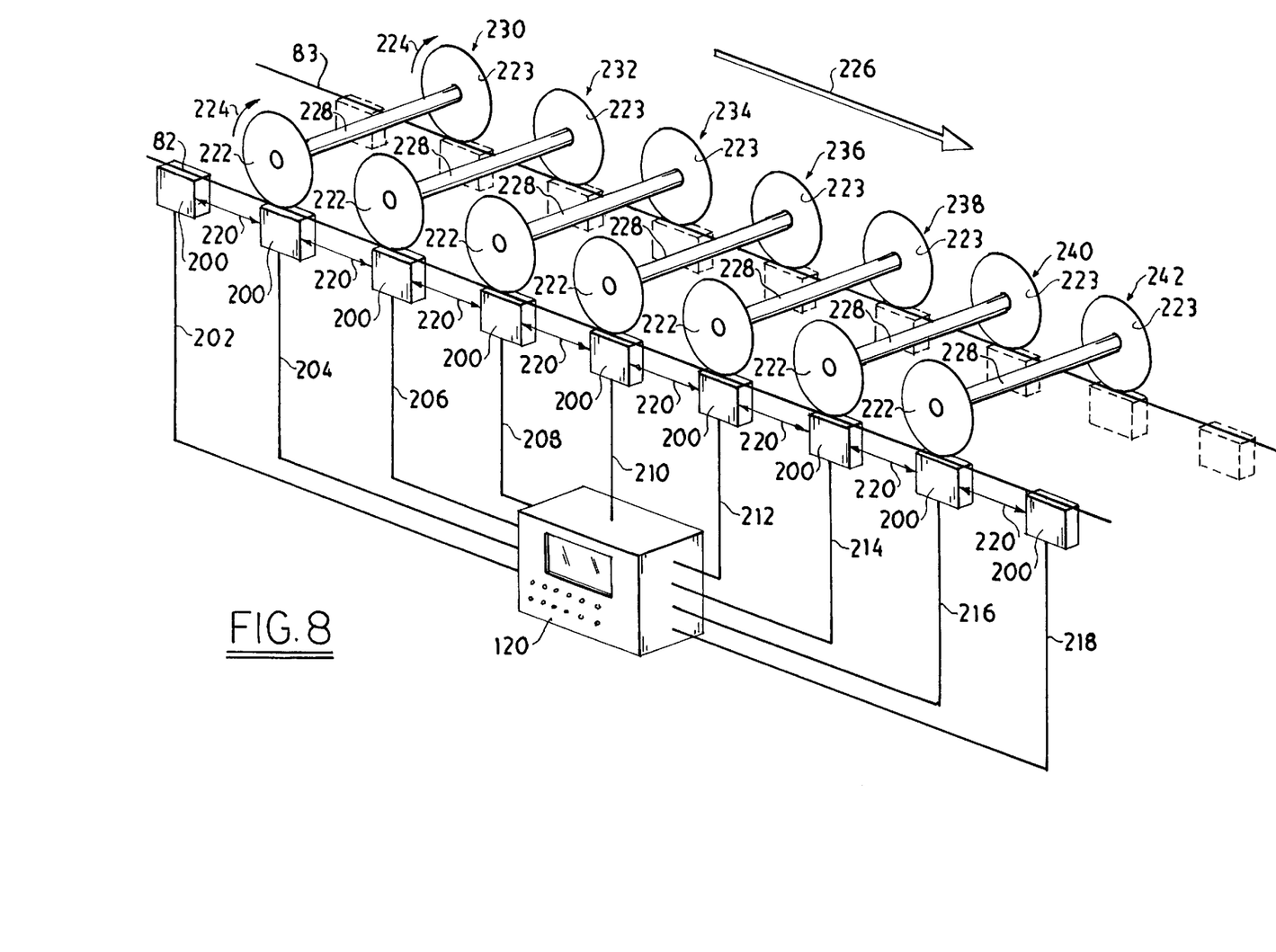
FIG. 8 is a schematic representation of one preferred process of the invention.

Referring to FIG. 8, it will be seen that a multiplicity of sensors 200 are preferably disposed below rails 82 and 83. As will be apparent to those skilled in the art, and referring to FIG. 4, the sensor units 200 may be disposed beneath rails 82 and 83 (see, e.g., elements 84 and 90 in FIG. 4), and/or on the side of rails 82 and 83 (see, e.g., elements 96 and 98 in FIG. 4). In one embodiment, each of sensor units 200 is comprised of a multiplicity of laser emitting and receiving units such as, e.g., units 94, 90, 96, and 98.

Referring again to FIG. 8, it will be seen that wheelset 228 comprising wheels 222 and 223 rides on rails 82 and 83 and, as it moves along such rails, assumes positions 230, 232, 234, 236, 238, 240, and 242. In the embodiment depicted in FIG. 8, only one wheelset 228 with wheels 222 and 223 with substantially the same diameter is illustrated.

As is known to those skilled in the art, any of the railway wheelsets known to those skilled in the art may be used in the process of this invention. Thus, e.g., one may use one or more of the wheelsets disclosed in U.S. Pat. Nos. 5,561,242, 5,555,632, 5,349,861, 4,928,798, 4,674,370, 4,674,369, and the like. The disclosure of each of these United States patents is hereby incorporated by reference into this specification.

Figure 9:
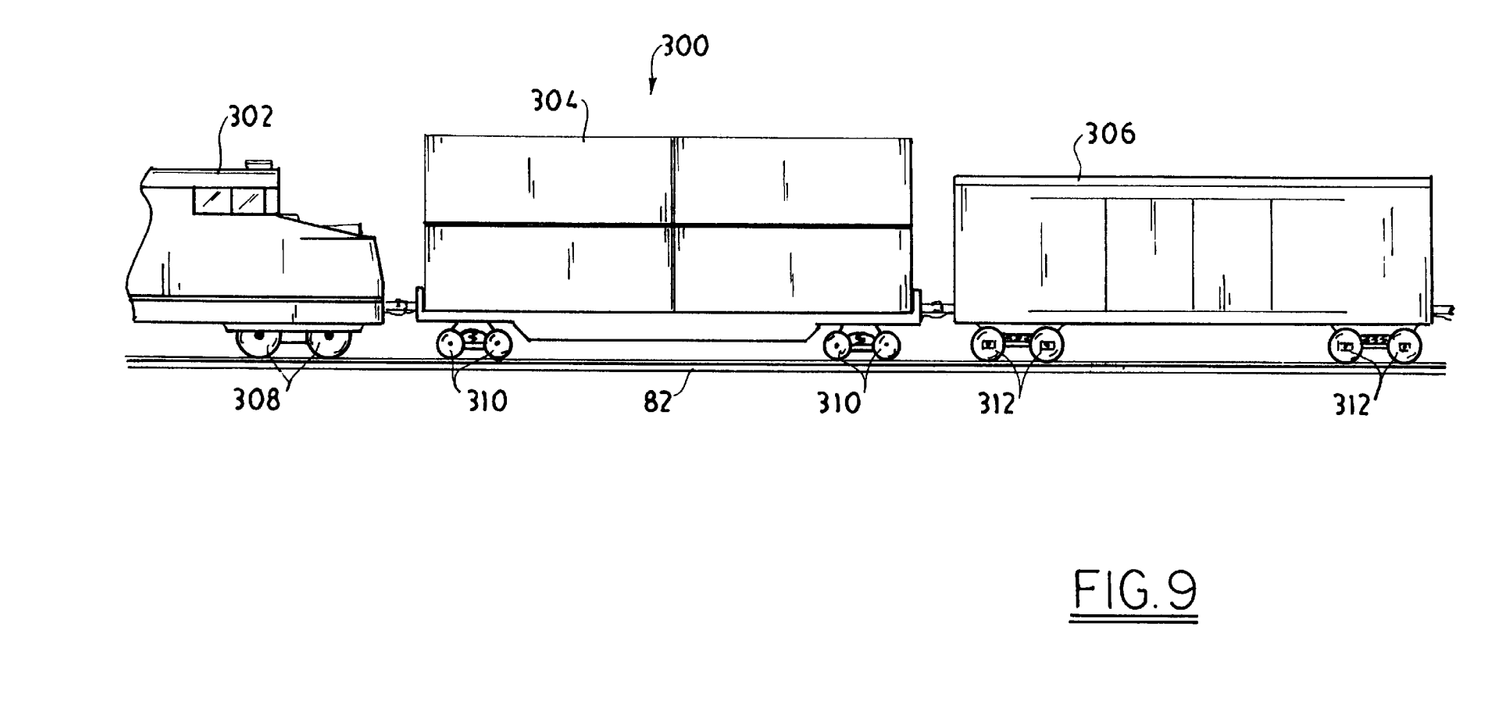
FIG. 9 is a schematic representation of several of the different wheelsets present in a typical train.

In most real life situations, however, a multiplicity of wheelsets with a multiplicity of wheels with different diameters will be measured by the process of this invention. Thus, e.g., FIG. 9 illustrates a typical train 300 which is comprised of a locomotive 302, car 304, and car 306. Typically, the wheels 308 on the locomotive 302 may have a diameter of about 1,300 millimeters. Typically the wheels 310 on car 304 may have a diameter of about 600 millimeters. Typically the wheels 312 on car 306 may have a diameter of about 900 millimeters. In the process of this invention all of the wheels on all of the wheelsets are monitored and evaluated. Thus, typically, in the process of this invention at least two wheelsets comprised of at least four wheels are simultaneously monitored and evaluated.

Figure 10:
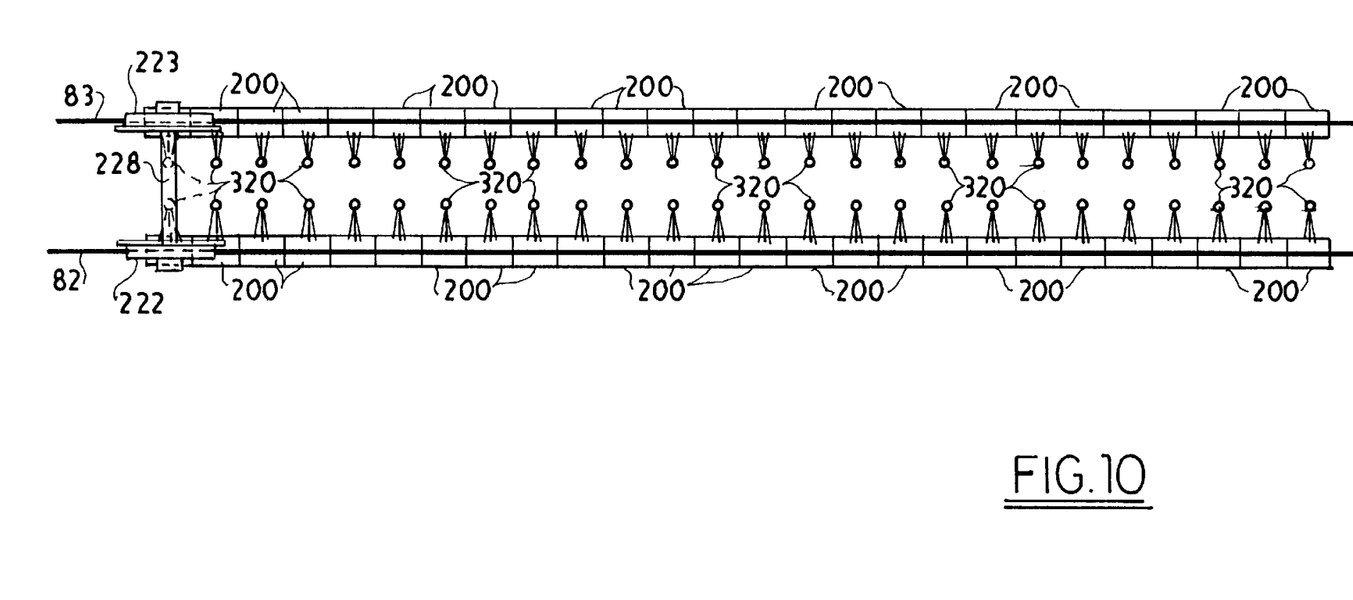
FIG. 10 is a schematic representation showing a wheelset and an array of twenty-six measuring devices.

FIG. 10 is a partial top view of wheelset 228 riding on rails 82 and 83. In the preferred embodiment depicted, it will be seen that a multiplicity of sensors 200 sense the laser beams 320 reflected from wheels 222 and 223. One may use any of the conventional means known to those skilled in the art for sensing relections of point beams of energy such as, e.g., the sensors disclosed in U.S. Pat. Nos. 5,636,026 of Mian, the entire disclosure of which is hereby incorporated herein by reference.

Referring again to FIG. 8, it will be seen that sensors 200 are operatively connected to computer 120 by means of data links 202, 204, 206, 208, 210, 212, 214, 216, and 218.

In the embodiment depicted in FIG. 8, the distance 220 between adjacent sensors 200 is from about 6 to about 12 inches. In one embodiment, distance 220 is 6 inches. In another embodiment, distance 220 is 12 inches.

Referring again to FIG. 8, and in the preferred embodiment depicted, a wheel 222 is shown rotating on track 82 in the direction of arrow 224; the other wheel on the wheelset 228, wheel 223, is rotating on track 83. Each of wheels 222 and 223 is preferably moving linearly in the direction of arrow 226 at a speed of less than about 6 miles per hour. In one embodiment, wheels 222 and 223 each is moving linearly at a speed of about 5 miles per hour.

In the process of this invention, each wheelset, such as wheelset 228, is rotated at a speed of less than about 75 revolutions per minute while moving the wheelset past a first sensor at a speed of less than about 6 miles per hour while impinging the wheelset with a multiplicity of laser beams. At least one of the properties of flange height, flange thickness, rim thickness, and tread contour are measured by the first sensor. In one embodiment, at least two of the properties of flange height, flange thickness, rim thickness, and tread contour are measured by the first sensor. In another embodiment, at least two of the properties of rim thickness, flange thickness, flange height, wheel reference groove, wheel diameter, flange throat profile, and wheel Gage are measured by the first sensor; see, e.g., U.S. Pat. No. 5,636,026, the entire disclosure of which is hereby incorporated herein by reference into this specification.

In one embodiment, the first sensor (and/or one or more of the other sensors) contains means to conduct radial runout analysis of the wheels 222 and 223. Thus, e.g., one may use one or more of the radial runout sensing means described in U.S. Pat. Nos. 5,345,672, 5,138,757, 5,103,595, 4,250,741, and the like; the entire disclosure of each of these United States patents is hereby incorporated by reference into this specification. Thus, e.g., one may use the radial runout analysis system described in an Aug. 21, 1996 publication by the International Electronic Machines Corporation (of 60 Fourth Avenue, Albany, N.Y. 12202) entitled "The IEM Rail Based Wheel Inspection System."

In one embodiment, the first sensor (and/or one or more of the other sensors) contains means for detecting wheel cracks in the wheels of the wheelsets. One may use any conventional means of wheel crack detections such as, e.g., one or more of the means disclosed in U.S. Pat. Nos. 5,145,127, 4,674,235, 4,137,516, 3,767,146, and the like; the entire disclosure of each of these United States patents is hereby incorporated by reference into this specification. Alternatively, or additionally, one may use the wheel crack detection system described in the aforementioned "The IEM Rail Based Wheel Inspection System."

In one embodiment, the wheel crack detection system utilizes electromagnetic acoustic transduction to generate an ultrasonic signal in the wheel without the need for a liquid couplant. Electromagnetic acoustic transduction is well known to those in the art and is described, e.g., in U.S. Pat.

Nos. 4,765,750, 4,711,152, 4,395,913, 4,296,486, and the like. The entire disclosure of each of these United States patents is hereby incorporated by reference into this specification.

In the process of this invention, and referring again to FIG. 8, each wheelset on the train car is rotated at a speed of 75 revolutions per minute and moved at a speed of less than 6 miles per hour while, in a period of less than about 20 seconds, being impinged with a multiplicity of laser beams while sequentially being moved past at least 26 separate sensors. In one embodiment, at least one point beam of energy is projected at a surface location on each wheel of each wheelset and preferably impinges such surface location from a substantially orthogonal direction, and the reflection from such point beam of energy is sensed in the sensor 200. For each surface location measured, a multiplicity of such measurements is made as each such wheel rotates, and the average of such measurements is computed for a more accurate determination of the parameter being measured.

ANOTHER PREFERRED PROCESS OF THE INVENTION

In another preferred process of the invention, the process of FIG. 8 is conducted with one or more wheelsets 228, but the wheelset is rotated at a speed of at least about 400 revolutions per minute while moving the wheelset at a speed of at least about 45 miles per hour. In this process, it is preferred to measure the presence of a high flange and/or a hollow tread on the wheel profiles of the wheelset while moving the wheelsets 228 past the sensors in less than about 20 seconds.

ANOTHER PREFERRED PROCESS OF THE INVENTION

In yet another preferred process the process of FIG. 8 is first conducted at a speed of at least about 400 revolutions per minute and a speed of at least 45 miles per hour, and thereafter it is conducted at a speed of less than about 75 revolutions per minute while moving the wheelset at a speed of less than about 6 miles per hour.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A process for measuring the wheel profiles of wheels of the wheelsets of a railroad car, comprising the steps of sequentially:

(a) rotating each of a first wheelset comprised of a first wheel and a second wheel, and a second wheelset comprised of a third wheel and a fourth wheel, at a speed of less than about 75 revolutions per minute while moving each of said first wheelset and said second wheelset at a speed of less than about 6 miles per hour, wherein each of said first wheelset and said second wheelset are impinged with laser beams in order to measure at least one of the properties of flange height, flange thickness, rim thickness, and tread contour of the wheel profiles of said wheelsets while passing each of said first wheelset and said second wheelset past a first sensor;

(b) thereafter moving each of said first wheelset and said second wheelset a distance of from about 6 to about 12 inches while rotating each of said first wheelset and said second wheelset at a speed of less than about 75 revolutions per minute and moving each of said first wheelset and said second wheelset at a speed of less than about 6 miles per hour, wherein each of said first wheelset and said second wheelset are impinged with laser beams in order to measure at least one of the properties of flange height, flange thickness, rim thickness, and tread contour of the wheel profiles of said wheelsets while passing each of said first wheelset and said second wheelset past a second sensor;

(c) thereafter repeating the steps of moving each of said first wheelset and said second wheelset a distance of from about 6 to about 12 inches while rotating each of said first wheelset and said second wheelset at a speed of less than about 75 revolutions per minute and moving each of said first wheelset and said second wheelset at a speed of less than about 6 miles per hour, wherein each of said first wheelset and said second wheelset are impinged with laser beams in order to measure at least one of the properties of flange height, flange thickness, rim thickness, and tread contour of the wheel profiles of said wheelsets while passing each of said first wheelset and said second wheelset past a third sensor, a fourth sensor, a fifth sensor, a sixth sensor, a seventh sensor, and eighth sensor, a ninth sensor, a tenth sensor, an eleventh sensor, a twelfth sensor, a thirteenth sensor, a fourteenth sensor, a fifteenth sensor, a sixteenth sensor, a seventeenth sensor, and eighteenth sensor, a nineteenth sensor, a twentieth sensor, a twenty-first sensor, a twenty-second sensor, a twenty-third sensor, a twenty-fourth sensor, a twenty-fifth sensor, and a twenty-sixth sensor, respectively, provided that each of said first wheelset and said second wheelset is moved past each of said sensors in a period of less than about twenty seconds.

2. The process as recited in claim 1, wherein each of said first wheel and said second wheel has a diameter which is different from the diameter of each of said third wheel and said fourth wheel.

3. The process as recited in claim 2 wherein each of said sensors is comprised of an optical sensor.

4. The process as recited in claim 3, wherein said optical sensor is comprised of a camera.

5. A process for measuring the wheel profiles of wheels of the wheelsets of a railroad car, comprising the steps of sequentially:

(a) rotating each of a first wheelset comprised of a first wheel and a second wheel, and a second wheelset comprised of a third wheel and a fourth wheel, at a speed of at least about 400 revolutions per minute while moving each of said first wheelset and said second wheelset at a speed of at least about 45 miles per hour, wherein each of said first wheelset and said second wheelset are impinged with laser beams in order to measure at least one of the properties of high flange and hollow tread of the wheel profiles of said wheelsets while passing each of said first wheelset and said second wheelset past a first sensor;

(b) thereafter moving each of said first wheelset and said second wheelset a distance of from about 6 to about 12 inches while rotating each of said first wheelset and said second wheelset at a speed of at least 400 revolutions per minute and moving each of said first wheelset and said second wheelset at a speed of at least about 45 miles per hour, wherein each of said first wheelset and said second wheelset are impinged with laser beams in order to measure at least one of the properties of high flange and hollow tread wheel profiles of said wheelsets while passing each of said first wheelset and said second wheelset past a second sensor;

(c) thereafter repeating the steps of moving each of said first wheelset and said second wheelset a distance of from about 6 to about 12 inches while rotating each of said first wheelset and said second wheelset at a speed of at least about 400 revolutions per minute and moving each of said first wheelset and said second wheelset at a speed at least 45 miles per hour, wherein each of said first wheelset and said second wheelset are impinged with laser beams in order to measure at least one of the properties of high flange and hollow tread of the wheel profiles of said wheelsets while passing each of said first wheelset and said second wheelset past a third sensor, a fourth sensor, a fifth sensor, a sixth sensor, a seventh sensor, and eighth sensor, a ninth sensor, a tenth sensor, an eleventh sensor, a twelfth sensor, a thirteenth sensor, a fourteenth sensor, a fifteenth sensor, a sixteenth sensor, a seventeenth sensor, and eighteenth sensor, a nineteenth sensor, a twentieth sensor, a twenty-first sensor, a twenty-second sensor, a twenty-third sensor, a twenty-fourth sensor, a twenty-fifth sensor, and a twenty-sixth sensor, respectively, provided that each of said first wheelset and said second wheelset is moved past each of said sensors in a period of less than about twenty seconds.

6. The process as recited in claim 5 wherein each of said first wheel and said second wheel has a diameter which is different from the diameter of each of said third wheel and said fourth wheel.

7. The process as recited in claim 6 wherein each of said sensors is comprised of an optical sensor.

8. The process as recited in claim 6 wherein said optical sensor is comprised of a camera.

\* \* \* \* \*